United States Patent [19]

DeRemer

[11] 4,307,285
[45] Dec. 22, 1981

[54] TOASTER/OVEN WITH REMOVABLE COOKING CHAMBER SIDE LINERS

[75] Inventor: Harold A. DeRemer, Allentown, Pa.

[73] Assignee: General Electric Company, New York, N.Y.

[21] Appl. No.: 1,529

[22] Filed: Jan. 8, 1979

[51] Int. Cl.³ .............................................. F24C 15/16
[52] U.S. Cl. ................................. 219/392; 126/39 M; 99/392; 99/399
[58] Field of Search ............................. 219/390–399, 219/403, 404, 413, 414; 99/329 R, 385, 391, 392, 399; 126/9 R, 39 M, 19; 312/350

[56] References Cited

U.S. PATENT DOCUMENTS

| | | | |
|---|---|---|---|
| 583,705 | 6/1897 | Hunt | 126/9 R |
| 743,933 | 11/1903 | Preisler et al. | |
| 2,742,559 | 4/1956 | Edelman | 312/350 |
| 2,746,448 | 5/1956 | Holmsten | 126/19 |
| 2,797,680 | 7/1957 | Nagel | 126/19 |
| 2,841,132 | 7/1958 | Philipp | 126/19 |
| 3,120,224 | 2/1964 | Divelbiss | 126/39 |
| 3,151,608 | 10/1964 | Hurko | 126/39 M |
| 3,153,408 | 10/1964 | Brillas | 126/39 |
| 3,159,156 | 12/1964 | Incledon | 126/39 |
| 3,344,779 | 10/1967 | Johnson | 126/19 |
| 3,410,260 | 11/1968 | Morgan | 126/19 |
| 3,425,405 | 2/1969 | Dills | 126/19 |
| 3,536,056 | 12/1970 | Dills | 126/19 |
| 3,856,374 | 12/1974 | Christen | 219/392 |

FOREIGN PATENT DOCUMENTS

| | | | |
|---|---|---|---|
| 565250 | 11/1944 | United Kingdom | 126/39 M |
| 838778 | 6/1960 | United Kingdom | 219/414 |

*Primary Examiner*—Richard R. Kucia
*Assistant Examiner*—Bernard Roskoski

*Attorney, Agent, or Firm*—Leonard J. Platt; George R. Powers; John F. Cullen

[57] ABSTRACT

A toaster/oven comprises a housing and a cooking chamber defined within the housing by a cooking chamber bottom panel, first and second cooking chamber side panels, a cooking chamber top panel and a cooking chamber back panel (which may be removable), the cooking chamber thereby defining a front opening. A door is pivotally mounted to the housing for closing the front opening. Removable cooking chamber side liners are removably mounted to the cooking chamber side panels and define grooves for supporting at least one rack therebetween. Each cooking chamber side liner has an offset flange including an offset portion and a tip extending from the top edge thereof and bottom tabs extending perpendicularly from the bottom edge thereof. Each cooking chamber side panel defines slot openings cooperatively positioned for receiving the offset flange and bottom tabs of one of the cooking chamber side liners for removably mounting the cooking chamber side liner thereto. Mounting is accomplished by sequentially inserting the offset top flange into the upper slot opening in the cooking chamber side panel and then pivoting the cooking chamber side liner about its top offset flange to insert the bottom tabs in their respective slot openings. Removal of the cooking chamber side liners is achieved by reversing the aforesaid procedure. The rack-receiving grooves are defined in a raised section of the cooking chamber side liners, each groove having a back portion and diverging legs, whereby the grooves are "open" for cleaning, and the raised section is characterized by an inclined transition to the flat perimeter of the removable cooking chamber side liner whereby the raised section resists accumulation of food soilage and is easy to clean.

7 Claims, 5 Drawing Figures

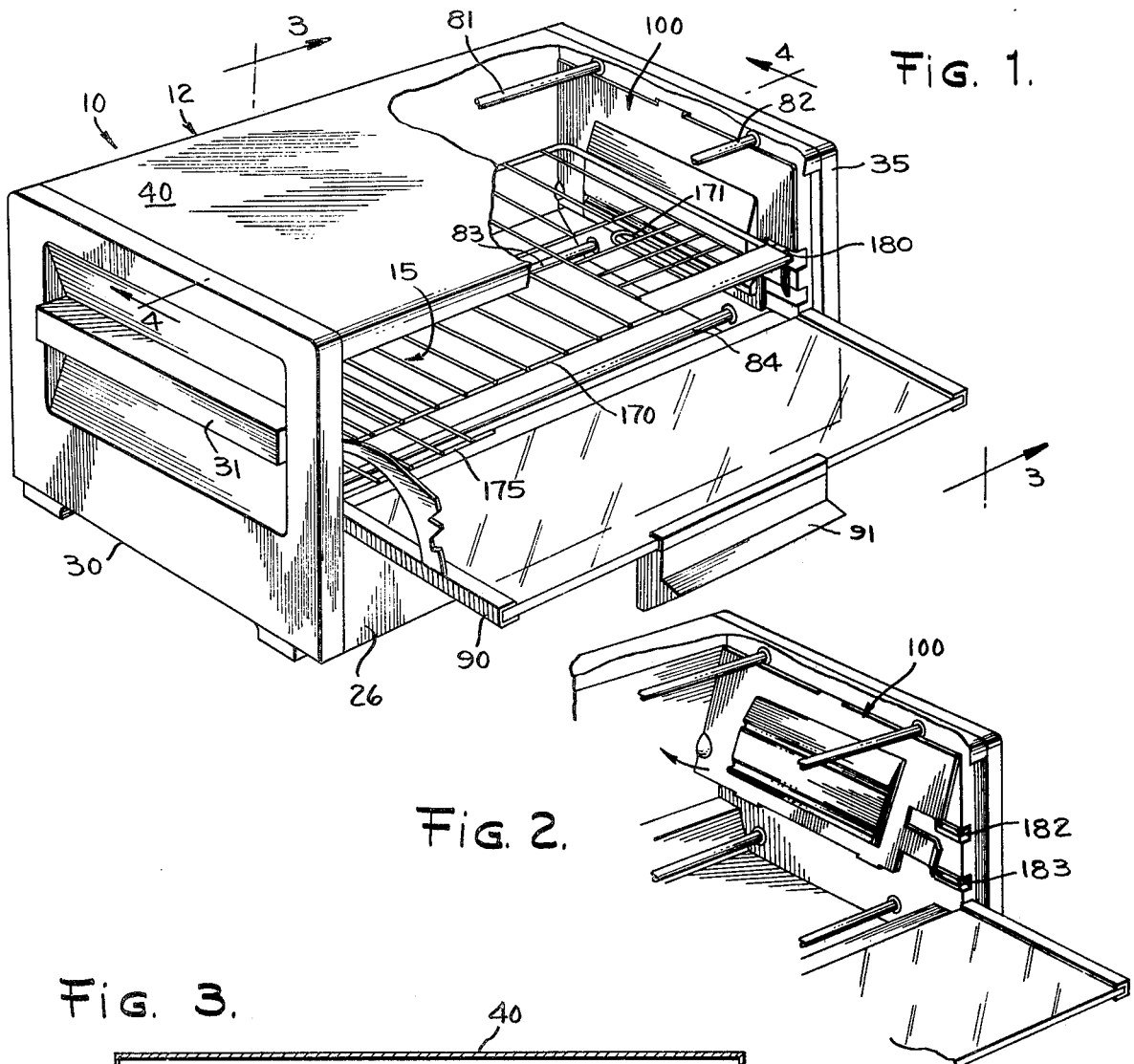
Fig. 1.
Fig. 2.
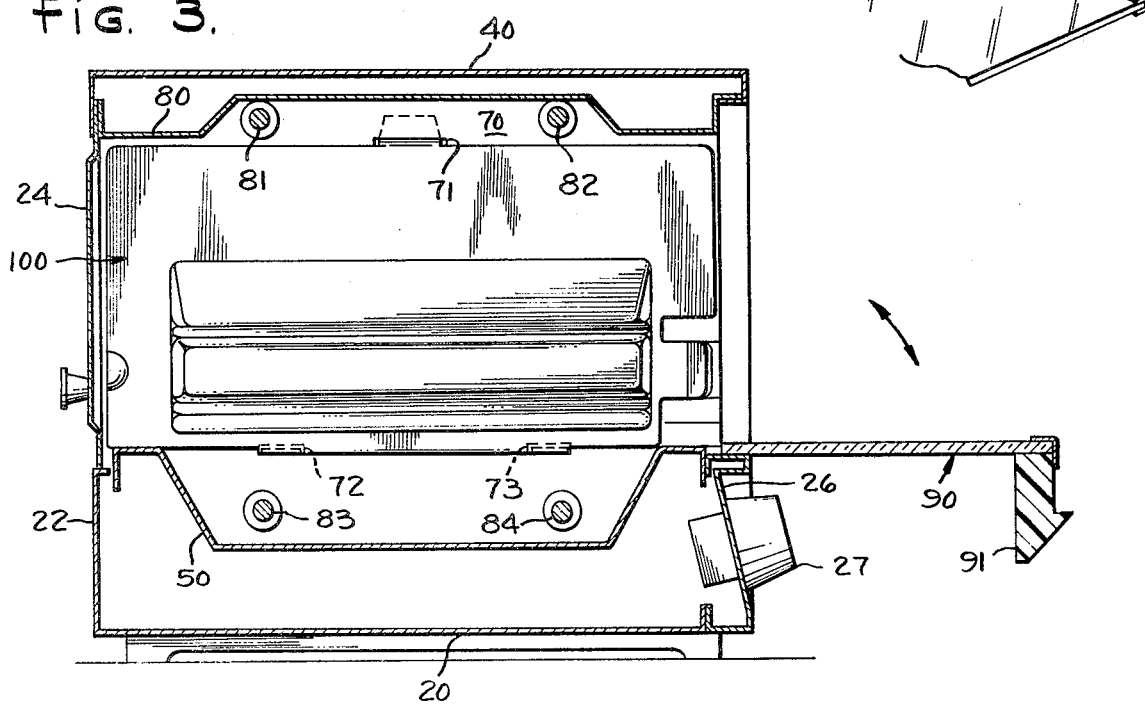
Fig. 3.

TOASTER/OVEN WITH REMOVABLE COOKING CHAMBER SIDE LINERS

BACKGROUND OF THE INVENTION

This invention relates to a toaster/oven with removable cooking chamber side liners which also function as rack supports.

Prior art toaster/ovens include a housing and a cooking chamber defined within the housing by a cooking chamber top panel, a cooking chamber bottom panel, cooking chamber side panels and a cooking chamber rear panel. A door is pivotally mounted to the housing and pivotal between an open position whereby food items can be inserted and removed from the cooking chamber and a closed position closing the cooking chamber. The door also can be provided with stop means to hold it in a partially open broil position.

The cooking chamber side panels include means for supporting one or more racks on which food items or containers for food items may be placed. In a recent development in toaster/ovens, a rack may incorporate a temperature sensor on which bread or the like being toasted by the toaster/oven is placed. The temperature sensor monitors the toasting operation for a highly accurate degree of toasting result. The rack includes one portion of the plug connector for connecting the temperature sensor into the control circuit of the toaster/oven, and the other portion of the plug connector is positioned on the cooking chamber side panel wherein the portions of the plug connector are connected when the rack is mounted in the cooking chamber.

Toaster/ovens are useful in a wide variety of cooking processes, including baking, warming, broiling, browning and toasting. In the course of carrying out these cooking processes, the interior of the cooking chamber tends to become soiled. In particular, grease and liquid food from containers can splash or splatter onto the cooking chamber side panels, and become baked on and difficult to remove.

Cleaning of the cooking chamber can be facilitated by mounting the door in a removable manner wherein the door can be cleaned separately from the rest of the cooking chamber and access to the cooking chamber for cleaning is enhanced. Cleanability of the cooking chamber may be further enhanced by providing a removable rear cooking chamber panel which also defines the rear of the toaster/oven housing, whereby removal of the removable rear cooking chamber panel permits access for cleaning the interior cooking chamber panels from the rear. Nevertheless, any improvement in the ease of cleaning the interior of the cooking chamber would be a welcome additional advance in toaster/ovens.

SUMMARY OF THE INVENTION

It is a principal object of the invention herein to provide a toaster/oven with improved cleanability.

It is an additional object of the invention herein to provide a toaster/oven with cooking chamber side liners which are removable for cleaning.

It is a further object of the invention to provide a toaster/oven with cooking chamber side liners which are easily removed and replaced.

It is another object of the invention herein to provide a toaster/oven with removable cooking chamber side liners wherein the removable cooking chamber side liners themselves are easily cleaned.

A toaster/oven according to the invention herein has two cooking chamber side liners which removably interlock with and mount covering at least a substantial portion of the cooking chamber side panels defining the sides of the cooking chamber. Each cooking chamber side liner has an offset flange extending from the top edge thereof, and the offset flange is received in a slot opening in the cooking chamber side panel. The top offset flange is provided with a tapered tip for easy insertion into the slot opening. At least one and preferably two tabs extend perpendicularly from the bottom edge of the cooking chamber side liner, and the bottom tabs are also received through cooperatively positioned slot openings in the cooking chamber side panel to vertically support the cooking chamber side liner thereon. The bottom tabs are also preferably tapered for easy insertion into the slot openings. The engagement of the top flange and bottom tabs of the cooking chamber side liner with the cooking chamber side panel also horizontally positions the cooking chamber side liner. Raised finger grips are provided on the side edges of the cooking chamber side liner. The cooking chamber side liner is easily removed by pivoting it about the top offset flange to release the bottom tabs and then withdrawing the top flange from its slot opening. The cooking chamber side liner is replaced by inserting the top offset flange in its slot opening and then pivoting the cooking chamber side liner about the top flange to insert the bottom tabs in their slot openings. This procedure is highly simplified and easy to carry out because the top offset flange and bottom tabs are inserted in sequence rather than simultaneously. The removable cooking chamber side liners may be identical and interchangeable from side to side in the cooking chamber.

The cooking chamber side liners support one or more racks extending therebetween. In particular, a raised central section of each cooking chamber side liner defines one or more horizontal grooves for receiving an edge of one or more racks. The backs of the grooves are positioned to permit the cooking chamber side liner to fit flat against the cooking chamber side panel to which it is mounted, and the raised section of the cooking chamber side liner defining the grooves is angled to the entrances of the grooves, thereby avoiding sharp corners which would be difficult to clean, and the grooves themselves diverge for easy cleaning.

Thus, the toaster/oven with removable cooking chamber side liners according to the invention herein is more easily cleaned than prior art toaster/ovens, and in particular the cooking chamber side liners protect the cooking chamber side panels from soiling and are themselves easily removed for cleaning and replaced after cleaning.

Other and more specific objects and features of the invention herein will in part be obvious and will in part appear from a perusal of the following description of the preferred embodiment and the claims taken together with the drawings.

DRAWINGS

FIG. 1 is a perspective view, partially cut away, of a toaster/oven having removable cooking chamber side liners according to the invention herein;

FIG. 2 is a perspective fragmentary view of the toaster/oven of FIG. 1 showing one of the removable cooking chamber side liners being removed or replaced;

FIG. 3 is a sectional view of the toaster/oven of FIG. 1 taken along the lines 3—3 of FIG. 1;

The same reference numerals refer to the same elements throughout the various Figures.

DESCRIPTION OF PREFERRED EMBODIMENT

Figure 4:
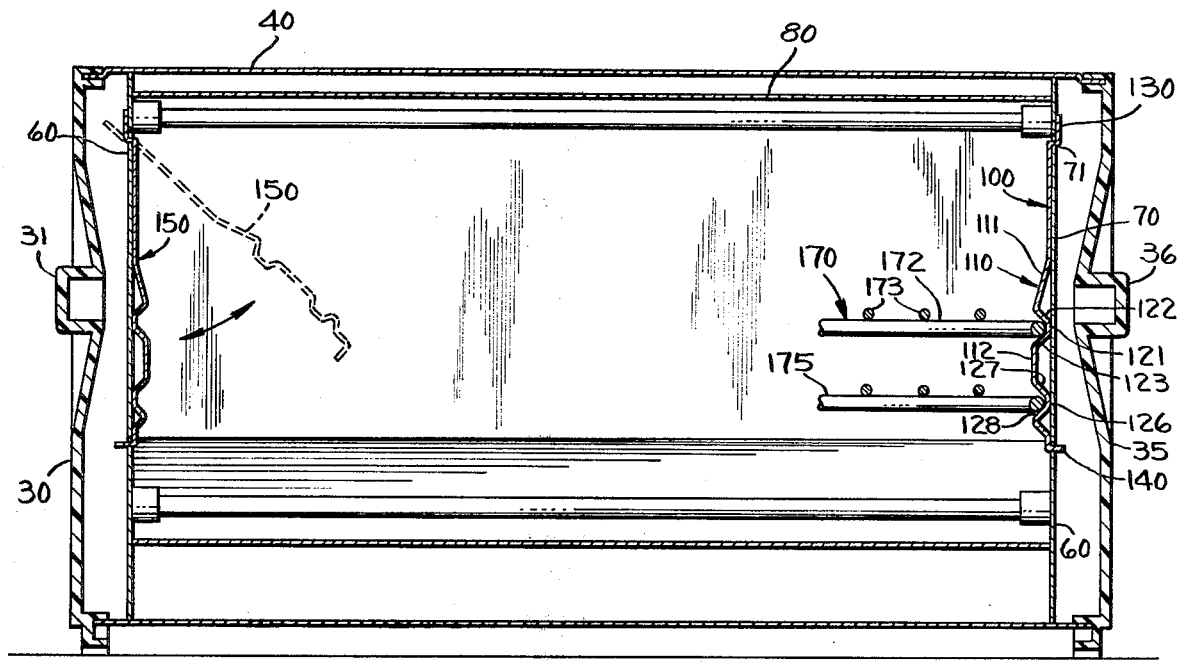
FIG. 4 is a sectional view of the toaster/oven of FIG. 1 taken along the lines 4—4 of FIG. 1.

A toaster/oven 10 has removable cooking chamber side liners 100 and 150, according to the invention herein. The toaster/oven 10 comprises a housing 12 which generally comprises a bottom wall 20, sidewalls 30 and 35 and a housing top wall 40. A cooking chamber 15 is defined within the housing 12 by a cooking chamber bottom panel 50 which is spaced apart from the housing bottom wall 20, cooking chamber side panels 60 and 70 which are respectively adjacent to but spaced apart from the housing sidewalls 30 and 35, and a cooking chamber top panel 80 which is disposed near the housing top wall 40. The housing 12 further comprises a lower back wall 22 extending generally between the housing bottom wall 20 and the cooking chamber bottom panel 50, and a lower front wall 26 similarly disposed on the front of the housing. A removable rear panel 24, best seen in FIG. 3, is mounted generally between the lower back wall 22 of the housing 12 and the cooking chamber top panel 80, wherein the removable rear panel 24 functions both as a portion of the back of the housing 12 and also defines the rear of the cooking chamber 15.

A door 90 having a handle 91 is pivotally mounted near its lower edge to the front of housing 12, above the lower front wall 26, for pivoting movement between a first open position, wherein food items can be inserted and removed from the cooking chamber 15, and a second closed position closing the front of the cooking chamber during cooking operations. Means to retain the door in a partially open broil position may also be provided. The housing sidewalls 30 and 35 may be provided, respectively, with handle portions 31 and 36 formed by the sidewalls, the handles providing a convenient means of moving the toaster/oven 10 from place to place.

The toaster/oven 10 further comprises heating elements 81-84, with heating elements 81 and 82 positioned in the cooking chamber 15 near the cooking chamber top panel 80, which may be recessed in its central portion, as best seen in FIG. 3, to provide a reflector for directing the heat from the heating elements 81 and 82 downwardly toward the central portion of the cooking chamber. Heating elements 83 and 84 extend across the bottom of the cooking chamber 15 adjacent to the cooking chamber bottom panel 50, which is also preferably recessed in its central portion to act as a reflector for the heat elements 83 and 84. A control circuit, not shown, but the elements of which may be mounted in the space between the cooking chamber bottom panel 50 and the housing bottom wall 20, controls the supply of power to the heating elements 81-84. Knobs, such as knob 27, mounted on the lower front wall 26 of the housing 12 may operate switches, thermostats, and the like to provide user control of the toaster/oven 10.

The toaster/oven 10 further comprises removable cooking chamber side liners 100 and 150. The cooking chamber side liners 100 and 150 may be identical, and they are removably mounted to the cooking chamber side panels 60 and 70, respectively, to cover substantial portions of the cooking chamber side panels and thereby protect them from soil. Racks 170 and 175 are supported horizontally between the removable cooking chamber side liners 100 and 150, as will be more fully discussed below. Rack 170 preferably incorporates a temperature sensor 171, such as thermocouple, which connects to the control circuit of the toaster/oven 10 through a plug connector 180. One portion of the plug connector 180 is mounted on the rack 170, and a second portion 182 of the plug connector 180 is mounted to the cooking chamber sidewall at 182 wherein the portions of the plug connector 180 are connected when the rack 170 is inserted in the toaster/oven 10. An additional second portion of the plug connector may be provided at 183 for connecting the temperature sensor 171 with the control circuit when the rack 170 is in the lower position. The second rack 175 is optional.

Figure 5:
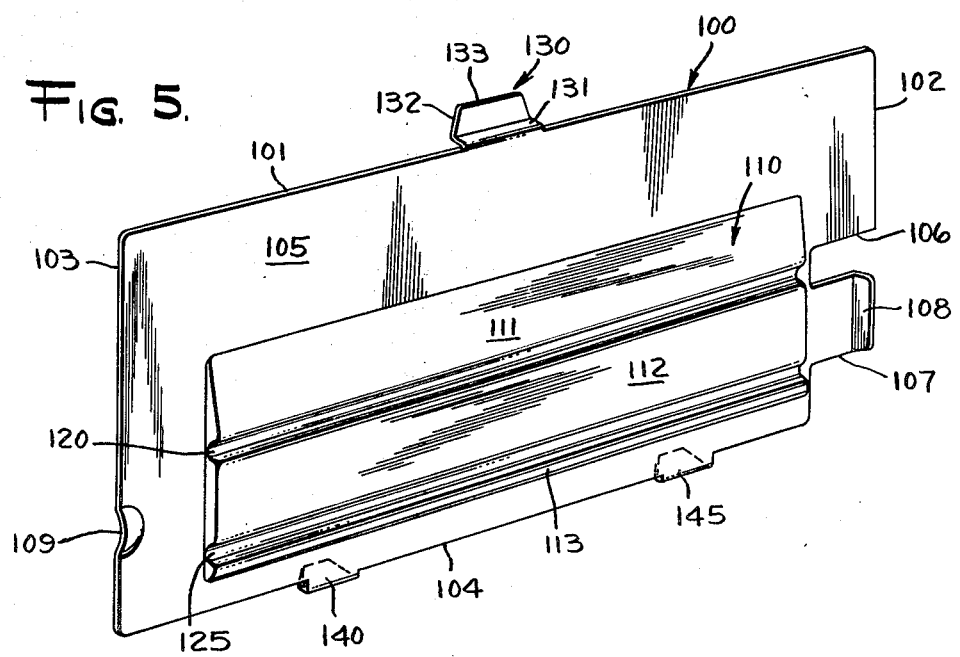
FIG. 5 is a perspective view of a removable cooking chamber side liner of the toaster/oven of FIG. 1.

With particular reference to FIG. 5, the removable cooking chamber side liner 100 has a substantially flat perimeter 105 and a central raised portion 110 defining horizontal rack receiving grooves 120 and 125. The removable cooking chamber side liner 100 has a top edge 101, side edges 102 and 103, and a bottom edge 104. An offset flange 130 extends from the top edge 101 at or near its midpoint, and in particular, an offset leg 131 of the top offset flange 130 extends rearwardly (with respect to the liner 100) from the top edge 101 and a tip 132 extends upwardly from the offset leg 131. The tip 132 is preferably tapered wherein its free end 133 has less width than the offset leg 131. Two spaced apart tabs 140 and 145 extend substantially perpendicularly rearward from the bottom edge 104 of the removable cooking chamber side liner 100. The tabs 140 and 145 are also preferably tapered, becoming narrower at their ends. A single bottom tab, preferably centered, is a viable modification.

As best seen in FIGS. 4 and 5, a raised central section 110 of the removable cooking chamber side liner 100 defines grooves 120 and 125 for supporting the racks 170 and 175 in cooking chamber 15. The groove 120 is generally U-shaped, having a back 121 and diverging upper and lower legs 122 and 123. The back 121 of the groove 120 is in the same plane as the flat perimeter 105 of the cooking chamber side liner 100, so that the removable cooking chamber side liner 100 will lie flat against the cooking chamber side panel 60 despite the grooves 122 and 123. An inclined portion 111 of the raised section 110 joins the upper leg 122 of the groove 120 with the flat perimeter 105 of the removable cooking chamber side liner 100. The lower groove 125 is also generally U-shaped, having a back 126 and diverging upper and lower legs 127 and 128. A flat portion 112 of the raised section 110 joins the lower leg 123 of the upper groove 120 with the upper leg 127 of the lower groove 125. A lower angled portion 113 of the raised section 110 connects the lower leg 128 of the groove 125 with flat perimeter of the removable cooking chamber side liner 100.

The side edge 102 of the removable cooking chamber side liner 100 defines notches 106 and 107, the notches 106 and 107 being aligned with the grooves 120 and 125, respectively. A portion of the edge 102, conveniently that portion of which separates notches 106 and 107, is angled inwardly to form a grip 108. A grip 109 is formed on the opposite side edge 103 raised, and the grip 109 may be rounded, as shown.

The cooking chamber side panel 70 defines an upper slot opening 71, which receives the top offset flange 130 of the removable cooking chamber side liner 100. The cooking chamber side panel 70 also defines two spaced apart lower slot openings 72 and 73, which are cooperatively positioned to receive the tabs 140 and 145 protruding perpendicularly from the lower edge of the removable cooking chamber side liner 100. When the top offset flange 130 is inserted through the slot opening 71 and the tabs 140 and 145 are inserted through their respective slot openings 72 and 73, the removable cooking chamber side liner 100 is positioned and held on the cooking chamber side panel 70. The cooking chamber side panel 60, opposite the cooking chamber side panel 70, is also provided with upper slot opening 61 and two spaced apart lower slot openings 62 and 63. The removable cooking chamber side liner 150, which may be identical with the cooking chamber side liner 100, is mounted to the cooking chamber side panel 60 by the insertion of its top offset tab through slot opening 61 and its lower tabs through the slot openings 62 and 63. The offset flanges and tabs of the removable cooking chamber side liners are accommodated between the cooking chamber side panels and the respective adjacent housing sidewalls.

It should be noted that the removable cooking chamber side liner 150 need not be provided with the notches 106 and 107, although it is preferable that the notches be provided so that the removable cooking chamber side liners 100 and 150 are interchangeable from side to side within the cooking chamber and also so that distinct manufacturing steps for the two panels are not required.

The racks 170 and 175 may be of the type fabricated of metal rod, and in particular, rack 170 has a perimeter rod 172 and crossing support rods 173. The perimeter rod 172 is received in the groove 120 of the removable cooking chamber side liner 100, and its opposed portion is received in the upper groove of the removable cooking chamber side liner 150 and the rack 170 may be slid horizontally into the grooves and removed in the same manner. The plug connector 180 is connected when the rack 170 is in position, so that the temperature sensor 171 is operative. Rack 175 is similarly supported between the groove 125 of the cooking chamber side liner 100 and the corresponding lower groove of the removable cooking chamber side liner 150.

The removable cooking chamber side liner 100 may be removed as follows. First, the lower edge of the removable cooking chamber side liner is pivoted outwardly with the top offset flange 130 defining the pivot axis, thereby removing the lower spaced apart tabs 140 and 145 from the lower slot openings 72 and 73 in the cooking chamber side panel 70. Once the tabs 140 and 145 are clear of their slot openings, the top offset flange 130 is withdrawn from the upper slot opening 71, whereby the cooking chamber side liner 100 is dismounted for removal from the cooking chamber 15 for cleaning. The cooking chamber side liner 100 is replaced in the cooking chamber by reversing the aforesaid procedure, i.e. by sequentially inserting the top offset flange 130 in the upper slot opening 71 and then pivoting the cooking chamber side liner 100 about the top offset flange 130 to insert the tabs 140 and 145 in their respective slot openings 72 and 73. Of course, the removal and replacement of the removable cooking chamber side liner 150 is similar. It will also be apparent that the racks 170 and 175 are removed prior to removing the cooking chamber side liners and can be replaced after the cooking chamber side liners have been replaced. The removal and replacement process is simplified in that the top offset flange and the lower tabs are inserted sequentially rather than simultaneously, i.e. the user does not have to simultaneously align the top offset flange and the lower tabs, which would be a more difficult procedure.

The configuration of the removable cooking chamber side liners 100 and 150 has other advantages, and in particular, the raised section 110 defining the rack-receiving grooves 120 and 125 employs inclined sections 111 and 113, which achieve a relatively smooth transition from the flat perimeter 105, whereby there are no sharp corners or ledges which would tend to accumulate large amounts of food soilage. In addition, the grooves 120 and 125 are also easily cleaned by virtue of their diverging legs, which provide good access for cleaning materials.

Accordingly, there has been described a toaster/oven having removable cooking chamber side liners which admirably achieve the objects of the invention herein. In particular, the removable cooking chamber side liners are extremely easy to remove and replace, and are also easily cleaned. It will be appreciated that changes may be made in the preferred embodiment described above by those skilled in the art without departing from the spirit and scope of the invention, which is limited only by the following claims.

I claim:

1. An improvement in toaster/ovens of the type comprising a housing and a cooking chamber defined within the housing by a cooking chamber bottom panel, first and second cooking chamber side panels, a cooking chamber top panel and a cooking chamber back panel, the cooking chamber defining a front opening, and a door pivotally mounted to the housing and pivotal between an open position and a closed position closing the front opening of the cooking chamber, the improvement comprising two removable cooking chamber side liners, one of which is removably mounted to the first cooking chamber side panel covering a substantial portion thereof and the other of which is removably mounted to the second cooking chamber side panel covering a substantial portion thereof, the removable cooking chamber side liners each having an outwardly extending depression defining at least one groove for supporting an edge of at least one rack therein, which groove is horizontally disposed when the removable cooking chamber side liner is mounted to its respective cooking chamber side panel, the removable cooking chamber side liners thereby providing means to support said at least one rack in a horizontal position therebetween, and wherein said at least one groove includes upper and lower outwardly extending rack-receiving grooves defined by each cooking chamber side liner in a central raised section thereof extending inwardly from a surrounding flat perimeter thereof, the grooves being generally U-shaped having the backs thereof in the same plane as the flat perimeter and having upper and lower diverging legs, whereby the grooves are easy to clean, and the raised section is characterized by an inclined transition portion between the flat perimeter and the upper diverging leg of the upper groove and a flat section extending between the lower leg of the upper groove and the upper leg of the lower groove, whereby the raised section of the cooking chamber side liner is easily cleaned and resists accumulating food soilage, and wherein each cooking chamber side liner has a top offset flange including an offset portion extending from a top edge of the cooking chamber side liner and a tip extending upwardly from the offset portion, and at least one bottom tab extending perpendicularly from the bottom edge of the cooking chamber side liner, and wherein the cooking chamber side panels of the toaster/oven each define upper and lower slot openings cooperatively positioned to receive the offset flange and at least one bottom tab of the cooking chamber side liners, whereby the removable cooking chamber side liners are each installed by sequentially inserting the top offset flange in the upper slot opening in the cooking chamber side panel and then pivoting the cooking chamber side liner about the top offset flange to insert the at least one bottom tab in the lower slot opening, and the cooking chamber side liners are removed by sequentially pivoting the cooking chamber side liner about the top offset flange to remove the bottom tabs and then withdrawing the top offset flange from the upper slot opening.

2. An improvement in toaster/ovens as defined in claim 1 wherein there are two spaced apart bottom tabs protruding perpendicularly from the bottom edge of each cooking chamber side liner.

3. An improvement in toaster/ovens as defined in claim 2 wherein the tip of the top offset flange is tapered and the bottom tabs are tapered, whereby the offset flange and the bottom tabs are easily inserted in the slot openings in the cooking chamber side panel.

4. An improvement in toaster/ovens as defined in claim 3 wherein at least the side edge of the cooking chamber side liner positioned near the front opening of the cooking chamber when the cooking chamber side liner is mounted therein has a raised grip thereon to facilitate pivoting the cooking chamber side liner about its top flange during removal thereof.

5. An improvement in toaster/ovens as defined in claim 4 wherein the cooking chamber side liners are identical and thereby interchangeably mounted on the first and second cooking chamber side panels, and both side edges of each cooking chamber side liner are provided with raised grips.

6. An improvement in toaster/ovens as defined in claim 3 wherein at least the side edge of the cooking chamber side liner positioned near the front opening of the cooking chamber when the cooking chamber side liner is mounted therein has a raised grip thereon to facilitate pivoting the cooking chamber side liner about its top flange during removal thereof.

7. An improvement in toaster/ovens as defined in claim 5 wherein there are two upper and lower outwardly extending rack-receiving grooves defined by each cooking chamber side liner in a central raised section thereof extending inwardly from a surrounding flat perimeter thereof, the grooves being generally U-shaped, having the backs thereof in the same plane as the flat perimeter and having upper and lower diverging legs, whereby the grooves are easy to clean, and the raised section is characterized by an inclined transition portion between the flat perimeter and the upper diverging leg of the upper groove and the upper leg of the lower groove, whereby the raised section of the cooking chamber side liner is easily cleaned and resists accumulating food soilage.

* * * * *